UNITED STATES PATENT OFFICE 2,641,542

DETOXIFYING TUNG MEAL

David G. Ulrey, St. Petersburg, Fla., assignor to Van M. Darsey, Detroit, Mich.

No Drawing. Application July 19, 1950, Serial No. 174,797

20 Claims. (Cl. 99—2)

The invention relates to a non-toxic tung meal and to a method of detoxifying tung meal or the like. More particularly, the invention concerns a dry process whereby tung meal is made suitable for animal and poultry feed.

The tung tree (Aleurites fordii) was introduced into the United States from China in 1905 by the United States Department of Agriculture and this was followed by commercial production of tung oil in this country in 1932. Since this latter date, the tung industry has been rapidly growing in significance. Evidence of this is the fact that United States production of tung nuts increased from 11,000 tons in 1939 to 67,200 tons in 1948.

The dry tung kernels contain about 50% oil and are pressed commercially by the expeller process which involves the steps of hulling, grinding, cooking, and pressing. A second process which is attracting increased interest involves solvent extraction of the oil. In either case, however, the residue after extraction of the oil is called the "press cake" and consists of approximately equal parts of shell and meal.

Although tung oil has been widely utilized, a serious problem has been encountered in the industry in connection with the utilization of tung meal. Its analysis indicates its great potential value as an animal and poultry feed, but unfortunately, tung meal contains a toxic ingredient which has prevented its inclusion in such foods. Rather, substantially all tung meal has been disposed of as a fertilizer which use represents a considerable economic waste.

The toxicity of tung meal has been recognized for many years, and considerable research in its detoxification has been carried out by the United States Department of Agriculture as well as by State universities. However, prior to the present invention, the cost of detoxifying tung meal has proved excessive and tung meal has not been able to compete economically with other meal feeds such as cotton seed and soybean meal. The known methods of detoxifying tung meal may be classified as "wet methods" and involve precipitation, filtration and drying; or involve a system of hydrolysis and drying; or involve solvent extraction. For example, a method has been suggested which comprises washing tung meal with steam at 200° F. to 225° F. for two hours. Another suggested method involves an extraction with ethyl alcohol followed by a recovery of the alcohol and the drying of the meal.

Many oil bearing seeds are known to be toxic, and the toxic principle has been categorized as a toxalbumin. Similarly, the toxic principle of tung meal has been found associated with the albumin fraction of the protein content and it is believed that tiglic acid is the specific toxic material. However, I do not wish to be bound by theoretical considerations since, whatever the toxic element may be, my invention provides for rendering it ineffective.

The invention provides for the production of a characteristic tung meal; that is, a tung meal characterized by the absence of toxic ingredients and further characterized by either the presence of a nitrogen-containing or ammonium soap or by the presence of a substantially reduced proportion of ether extractable fat. The method of the invention comprises the step of treating tung meal with a compound of the class consisting of ammonia and amines having a significantly high vapor pressure at a temperature less than about 250° F. In its preferred form, the invention comprises subjecting the tung meal to anhydrous ammonia for a time sufficient to reduce the toxicity of the meal.

The preferred procedure for detoxifying tung meal residue is as follows: The press cake is put through a hammer mill to break up the cake to a relatively small particle size; e. g. to pass through a 12 mesh screen. The particles are then placed inside a container, and anhydrous ammonia introduced at the rate of about 5 oz. for each 100 lbs. tung meal, the container then rotated at about 20 R. P. M. and the contents heated to about 200°–250° F. producing a pressure inside the container of 50 to 60 p. s. i. or about 4 atmospheres. The temperature is maintained at about 200°–250° F. for about 15–30 minutes and is then gradually decreased over a period of about 15–30 minutes. At that time any residual pressure or residual gas is exhausted.

Example #1

One ton of tung meal in the form of pressed cake was ground in a hammer mill until all the particles of the meal passed through a 12 mesh screen. The particles were then placed in a 100 cu. ft. steam jacketed, rotatable drum, the internal surface of which was provided with a baffle which agitated the meal as the drum was revolved. Anhydrous ammonia was introduced into the drum at the rate of 4.5 ounces of ammonia to each 100 pounds of tung meal and the contents heated to 225° F. The temperature inside the rotating drum was maintained between 200°–250° F. and the pressure inside the drum was maintained between 50 and 60 pounds per square inch for a period of 30 minutes. At this point, the heat was shut off and the reaction was permitted to continue for an additional 30 minutes. The residual pressure was then released and the meal was discharged from the drum. Tests of the meal proved it to be non-toxic when used as an animal and poultry feed. Analysis of the meal before and after treatment was as follows:

| | | |
|---|---|---|
| Moisture | 12.01% | 8.9%. |
| Protein (NK 6.25) | 24.16% | 21.40%. |
| Fat (ether extract) | 6.02% | 0.54%. |
| Fiber | 21.60% | 30.65%. |
| Ash | 5.01% | 5.20%. |
| N. F. E. (nitrogen free extract) | 31.20% | 41.32%. |
| Color | Dark Brown and Resilient. | Dark Brown and Brittle. |

*Example #2*

Fifteen hundred pounds of tung meal were ground in a hammer-mill and placed inside a 100 cu. ft. steam jacketed, rotatable drum and 500 lbs. of 80 Brix molasses added. The door of the drum was closed and 5 lbs. of anhydrous ammonia introduced therein and the contents heated to 225° F. The temperature inside the rotating drum was maintained between 200°–250° F. and the pressure inside the drum between 50 and 60 lbs. per square inch for a period of 30 minutes. At this point the heat was shut off and the reaction was permitted to continue for an additional 30 minutes. The residual pressure was then released and the meal discharged from the drum. Tests of the meal proved it to be non-toxic when used as animal feed.

Analysis of meal after treatment was as follows:

| | Per cent |
|---|---|
| Moisture | 10.01 |
| Protein (NK 6.25) | 21.41 |
| Fat | .55 |
| Fiber | 29.50 |
| Ash | 4.80 |
| Sugar | 12.50 |
| N. F. E. | 44.85 |

Additional examples were made using a number of combinations of temperatures and pressures as low as room temperature and atmospheric pressure. It was found that there are no critical limitations on temperature or pressure since a reduction in either one of these variables merely increases the time required for a significant decrease in the toxicity of the meal. There are, however, practical limitations on the process. I have found that at temperatures substantially below 200° F. and at pressures substantially below about 4 atmospheres the ammoniating reaction is too slow for practical purposes and their use would constitute merely the carrying out of the invention in an imperfect manner.

Similarly, exposing tung meal to a temperature in excess of 250° F. leads to undesirable changes in the meal. Such temperatures can be used for short periods of time but no advantage is gained thereby. In this connection, the heat of chemical reaction is almost sufficient to maintain the reaction temperature once reaction conditions are established. Therefore, very little auxiliary heat is required. There is no critical upper limit to pressure. However, little additional advantage is secured at pressures in excess of 4 atmospheres especially in view of the fact that the equipment required to hold higher pressures becomes increasingly expensive.

The minimum proportion of ammonia to be used depends upon the proportion of reactive material present in the meal. However, the use of the exact minimum proportion of ammonia required would result in an unduly slow reaction rate and no purpose would be served by operating in such a restricted manner. It is therefore recommended that an excess of ammonia be used in order to provide for rapid and intimate contact of the gas with the particles of the meal. I have found a ratio of about 5 ounces of ammonia to each 100 pounds of tung meal to be a practical proportion. Proportions of ammonia greater than this can be used but no additional advantage is secured over the proportion stated.

As indicated previously, the toxic component of tung meal can be eliminated by the use of amines as well as by the use of ammonia. These compounds apparently have the same reaction as ammonia; that is, they effect in substance a dry saponification of the fats and form salts with at least some of the acids present. Thus, the resulting meal, whether ammonia or an amine is used, is characterized by the presence of nitrogen-containing soaps and also by the substantial reduction in the proportion of ether-extractable fat.

The particular amine used is not critical to the invention. However, to carry out the reaction in a reasonable or practical period of time it is necessary that the amine have a significant vapor pressure at the reaction temperature; that is, at temperatures below about 250° F. Thus, it is preferred that a normally gaseous or normally liquid amine be used and, more particularly, it is preferred that amines having a boiling point of less than about 250° F. be used. In this connection, the primary aliphatic amines such as methyl amine, ethyl amine, propyl amine, butyl amine, and pentyl amine; the secondary aliphatic amines such as methyl, ethyl, and propyl amines; and the tertiary aliphatic amines such as methyl and ethyl amines are especially suitable. Similarly, diamines and amines containing other functional groups and which do not leave toxic residues as a result of the reaction with the tung meal are suitable.

As indicated previously, the time for the reaction will depend principally on the temperature, pressure, and proportion of ammonia. In addition to these factors, the time of reaction will depend to some degree on the size of the meal particles and the intimacy of contact between gas and the particles. However, under the preferred conditions—that is, at a temperature in the range of about 200°–250° F. and under a pressure of about 4 atmospheres and using about 5 ounces of ammonia for each 100 pounds of meal—the complete detoxification requires between 30 and 60 minutes. In this connection and in the interests of time-saving, about one-half of the reaction can be carried out at the elevated temperatures and the balance while the meal is cooling.

In the method of the invention, wetting of the meal is unnecessary and the products of the reaction need not be separated from the meal. In this manner, many processing steps heretofore thought necessary in the detoxification of tung meal have been eliminated.

An additional advantage which has been secured through the use of the method of the invention is concerned with the blending of other feeds with detoxified tung meal to provide an enriched feed mix. Since these supplementary feeds; particularly citrus pulp, molasses, cotton seed meal, peanut meal, and soya meal; are easily mixed with tung meal in rotating drums, they can be added to the tung meal in the rotatable drum just prior to the detoxification reaction, thus saving the step of handling the tung meal in a separate mixing operation. In this manner, the proportions of sugar, protein, and fat in the final feed mix can be varied within wide limits. The addition of such materials to tung meal does not interfere with the detoxifying reaction. Molasses and citrus pulp especially are benefited by the mixing because the presence of the treated tung meal offsets their hygroscopic property.

A further advantage is secured from the invention by the pelleting of the detoxified tung meal or of mixtures comprising tung meal with citrus pulp, molasses, cotton seed meal, peanut meal or soya meal. The particles of tung meal, which are converted from a somewhat resilient form to a somewhat brittle form during the detoxification reaction, lend themselves readily to packing in pellet form and commercially available machinery may be used in the operation.

I claim:

1. A method of reducing the concentration of toxic ingredients in tung meal which comprises the step of treating said meal with a compound selected from the group consisting of ammonia and amines having a boiling point less than about 250° F.

2. A method of preparing a non-toxic feed which comprises treating tung meal and at least one of the group consisting of citrus pulp, molasses, cotton seed meal, peanut meal, and soya meal with a compound selected from the group consisting of ammonia and amines having a boiling point less than about 250° F.

3. A method of reducing the concentration of toxic ingredients in tung meal which comprises the step of treating said meal with ammonia.

4. A method of reducing the concentration of toxic ingredients in tung meal which comprises the step of treating said meal with anhydrous ammonia gas.

5. A method of reducing the concentration of toxic ingredients in tung meal which comprises the step of treating said meal with an amine having a boiling point less than about 250° F.

6. A method of detoxifying tung meal which comprises bringing ammonia into intimate contact with said tung meal at an elevated temperature and under superatmospheric pressure.

7. A method of detoxifying tung meal which comprises bringing ammonia into intimate mixture with said tung meal at a temperature of about 200°–250° F. and under a pressure of about 4 atmospheres.

8. A method of detoxifying tung meal which comprises bringing an amine having a boiling point below about 250° F. into intimate mixture with said tung meal at a temperature of about 200°–250° F. and under a pressure of about 4 atmospheres.

9. A method of detoxifying particles of tung meal which comprises raising the temperature of said meal to about 200°–250° F., bringing ammonia into intimate contact with said particles at a pressure of about 4 atmospheres and in a proportion of about 5 ounces of ammonia for each 100 pounds of tung meal; maintaining said contact for a period of about 15 to 30 minutes; permitting the ammoniating reaction to continue for an additional 15 to 30 minutes under gradually reducing temperatures, and thereafter reducing the pressure to atmospheric.

10. A method of detoxifying particles of tung meal which comprises raising the temperature of said meal to about 200°–250° F., bringing an amine having a boiling point below about 250° F. into intimate contact with said particles at a pressure of about 4 atmospheres and in a proportion of about 5 ounces of ammonia for each 100 pounds of tung meal; maintaining said contact for a period of about 15 to 30 minutes; permitting the ammoniating reaction to continue for an additional 15 to 30 minutes under gradually reducing temperatures, and thereafter reducing the pressure to atmospheric.

11. A tung meal suitable for use as feed for animals and poultry, characterized by the absence of toxic ingredients and containing an ammonium soap of the toxic ingredient present in raw tung meal.

12. A feed comprising molasses and a tung meal characterized by the absence of toxic ingredients and containing the reaction product of raw tung meal and a reactant selected from the group consisting of ammonia and amines having a boiling point less than about 250° F.

13. A feed comprising citrus pulp and a tung meal characterized by the absence of toxic ingredients and containing the reaction product of raw tung meal and a reactant selected from the group consisting of ammonia and amines having a boiling point less than about 250° F.

14. A feed comprising cotton seed meal and a tung meal characterized by the absence of toxic ingredients and containing the reaction product of raw tung meal and a reactant selected from the group consisting of ammonia and amines having a boiling point less than about 250° F.

15. A feed comprising soya meal and a tung meal characterized by the absence of toxic ingredients and containing the reaction product of raw tung meal and a reactant selected from the group consisting of ammonia and amines having a boiling point less than about 250° F.

16. A feed comprising peanut meal and a tung meal characterized by the absence of toxic ingredients and containing the reaction product of raw tung meal and a reactant selected from the group consisting of ammonia and amines having a boiling point less than about 250° F.

17. A feed in pellet form and comprising detoxified tung meal characterized by the absence of toxic ingredients and containing the reaction product of raw tung meal and a reactant selected from the group consisting of ammonia and amines having a boiling point less than about 250° F.

18. A feed comprising tung meal characterized by the absence of toxic ingredients and containing an ammonium soap of the toxic ingredient present in the raw tung meal and at least one of the group consisting of citrus pulp, molasses, cotton seed meal, soya meal, and peanut meal.

19. A tung meal characterized by the absence of toxic ingredients and containing the reaction product of raw tung meal and an amine having a boiling point less than about 250° F.

20. A tung meal characterized by the absence of toxic ingredients and containing the reaction product of raw tung meal and a reactant selected from the group consisting of ammonia and amines having a boiling point less than about 250° F.

DAVID G. ULREY.

References Cited in the file of this patent

UNITED STATES PATENTS

| Number | Name | Date |
|---|---|---|
| 2,065,848 | Anderson | Dec. 29, 1936 |
| 2,167,723 | Meakin | Aug. 1, 1939 |
| 2,297,503 | Rudolph | Sept. 29, 1942 |
| 2,316,014 | Olcott | Apr. 6, 1943 |
| 2,458,679 | Buxton | Jan. 11, 1949 |
| 2,484,831 | Hutchins et al. | Oct. 18, 1949 |